(12) United States Patent
Belinguier

(10) Patent No.: US 7,064,457 B2
(45) Date of Patent: Jun. 20, 2006

(54) RECOGNITION DEVICE INTENDED TO ORDER THE UNLOCKING OF A VEHICLE DOOR AND/OR TO AUTHORIZE THE STARTING OF A VEHICLE

(75) Inventor: Thierry Belinguier, Saint-Maurice (FR)

(73) Assignee: Valeo Electronique, Creteil Cedex ( * ) Notice: Subject to any disclaimer, the term of this patent is extended or adjusted under 35 U.S.C. 154(b) by 312 days.

(21) Appl. No.: 10/471,357

(22) PCT Filed: Mar. 11, 2002

(86) PCT No.: PCT/EP02/02654

§ 371 (c)(1),
(2), (4) Date: Sep. 11, 2003

(87) PCT Pub. No.: WO02/072987

PCT Pub. Date: Sep. 19, 2002

(65) Prior Publication Data

US 2004/0075341 A1    Apr. 22, 2004

(30) Foreign Application Priority Data

Mar. 12, 2001 (FR) .................................. 01 03484

(51) Int. Cl.
*B60R 25/00* (2006.01)
(52) U.S. Cl. ..................................... 307/10.2; 307/10.1
(58) Field of Classification Search ................ 307/10.2, 307/10.1
See application file for complete search history.

(56) References Cited

U.S. PATENT DOCUMENTS

| | | | | |
|---|---|---|---|---|
| 5,684,337 A | * | 11/1997 | Wallace ...................... | 307/10.2 |
| 5,804,888 A | * | 9/1998 | Murr et al. ................. | 307/10.2 |
| 5,905,431 A | * | 5/1999 | Mueller et al. ......... | 340/426.17 |
| 2004/0046451 A1 | * | 3/2004 | Shibagaki et al. ......... | 307/10.2 |

FOREIGN PATENT DOCUMENTS

| | | |
|---|---|---|
| DE | 197 32 157 A1 | 1/1998 |
| FR | 2 746 235 | 9/1997 |
| GB | 2 119 141 A | 11/1983 |

OTHER PUBLICATIONS

Patent Abstracts of Japan; publication No. 9-144,404, published on Jun. 3, 1997 (1 page).

* cited by examiner

*Primary Examiner*—Lynn Feild
*Assistant Examiner*—Michael Rutland-Wallis
(74) *Attorney, Agent, or Firm*—Osha Liang LLP

(57) ABSTRACT

A recognition device is described that is used to control the unlocking of vehicle openings and/or to authorize the start-up of the vehicle. The device includes a first emitter which, on command, can send a first user identification signal over a carrier wave having a given first frequency (v1) to a receiver. The device also includes a second emitter which can emit at least one second user identification signal over a carrier wave having a second frequency (v2) which is different from the first frequency such that the second signal can act as an identifier signal in the shadow zones where the first signal is not recognized.

7 Claims, 3 Drawing Sheets

RECOGNITION DEVICE INTENDED TO ORDER THE UNLOCKING OF A VEHICLE DOOR AND/OR TO AUTHORIZE THE STARTING OF A VEHICLE

The present invention relates to a recognition device intended for controlling the unlocking of openable panels of a vehicle and/or for authorizing the starting of a vehicle.

Radiofrequency identification devices are known which comprise a portable transmitter that transmits a coded carrier wave to a receiver. There is provided, arranged in the motor vehicle, a receiver that receives this coded wave and compares the latter with a coded preset and which, when the two items of information coincide, produces a signal for locking and unlocking openable panels of the vehicle.

However, these recognition devices do not operate in certain zones around the vehicle, which are commonly referred to as "shadow zones" in respect of the identification devices known in the art.

Figure 1:
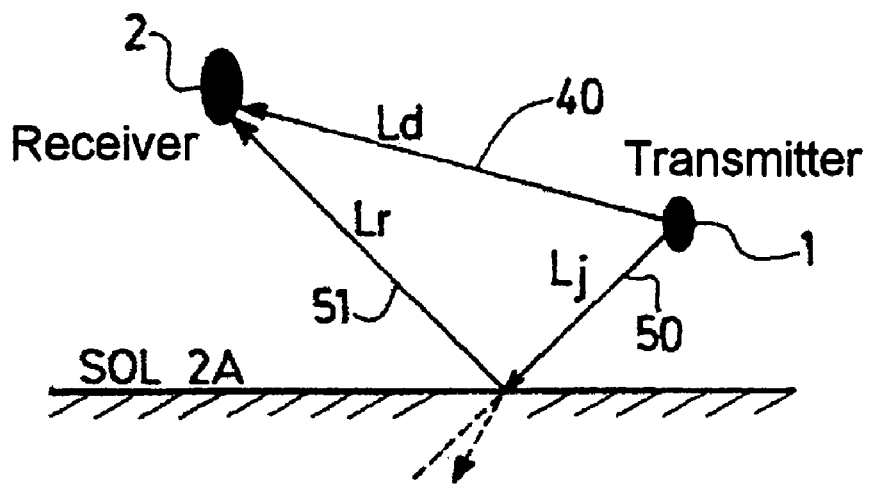

FIG. 1 illustrates the problem related to the existence of these shadow zones. When commanded by the user, the transmitter 1 transmits an identification signal to the vehicle. Part of the signal transmitted travels the distance Ld indicated by the arrow 40 and reaches the receiver 2 directly. Another part of the signal transmitted indicated by the arrows 50 and 51 reaches the receiver after reflection off obstacles for example the ground 2A which surround the vehicle. The signal thus reflected is phase shifted with respect to the signal received directly by the receiver 2. On account of this phase shift, there are localized areas in which the direct incident wave superposed on the reflected wave is not recognized by the receiver 2. As a consequence, the recognition device does not operate in these localized zones often referred to as "shadow zones".

More specifically, FIG. 1 represents a simplified diagram of the operation of an identification device. In this diagram is considered the path of a wave 40 which reaches the receiver directly and the path of a wave 50, 51 which is reflected off the ground 2A.

The wave transmitted by the transmitter 1 has the form:

$\vec{A}^e = A_1 \times e^{j2\pi v_o t}$ where $v_o$ represents the frequency of the wave transmitted and where $A_1$ is a constant.

A part of the wave 40 received directly by the receiver 2 has the form:

$$\vec{A_d} = A_2 \times e^{\frac{j2\pi L_d}{\lambda_0}} \cdot \vec{A_e}$$

where Ld represents the distance traveled by the transmitted wave between the transmitter 1 and the receiver 2, $\lambda_o$ is the wavelength of the transmitted wave and where $A_2$ is dependent on the wavelength and on the distance traveled by the wave.

Another part 50 of the wave is firstly reflected by the ground 2A then reaches the receiver 2. This wave 50, 51 has the form:

$$\vec{A_r} = A_3 \times e^{j\left[2\pi \frac{(L_j + L_r)}{\lambda_0} - \varphi\right]} \cdot \vec{A_e}$$

where $L_j$ represents the distance traveled by the transmitted wave between the transmitter 1 and the ground 2A, $L_r$ the distance traveled by the transmitted wave between the ground 2A and the receiver 2, $\lambda_o$ is the wavelength of the transmitted wave and where $A_3$ is a function of the wavelength and of the distances traveled by the wave.

The total wave which arrives at the receiver therefore has the form:

$$\vec{A_t} = \left[ A_2 \times e^{\frac{j2\pi L_d}{\lambda_0}} + A_3 \times e^{j\left[2\pi \frac{(L_j + L_r)}{\lambda_0} - \varphi\right]} \right] \cdot \vec{A_e}.$$

This wave varies as a function of the distance between the user and his vehicle and as a function of the frequency of the carrier wave transmitted.

An aim of the present invention is to provide a reliable identification device despite the phase shift engendered by the reflection of the waves against obstacles.

Accordingly, the subject of the invention is an identification device intended for controlling the unlocking of openable panels of a vehicle and/or for authorizing the starting of a vehicle comprising a first transmitter which, on command, is able to send a first user identification signal on a carrier of a first given frequency (v1) to a receiver, characterized in that it comprises a second transmitter able to transmit at least one second user identification signal on a carrier of a second frequency (v2) different from the first frequency in such a way that this second signal can serve as identifying signal in the shadow zones of nonrecognition of the first signal.

The device according to the invention can furthermore comprise one or more of the following characteristics:
- the first and the second signals are transmitted simultaneously,
- the second signal is transmitted offset after the first signal,
- the first and second transmitters are formed by a transmission unit comprising means for toggling from the first to the second frequency and vice versa,
- these frequency toggling means comprise a synthesizer,
- the synthesizer comprises a frequency divider controlled by a microcontroller and a phase locked loop,
- the first frequency (v1) is a harmonic of the second carrier frequency (v2),
- the first frequency (v1) is substantially equal to 400 Megahertz.

Figure 2:
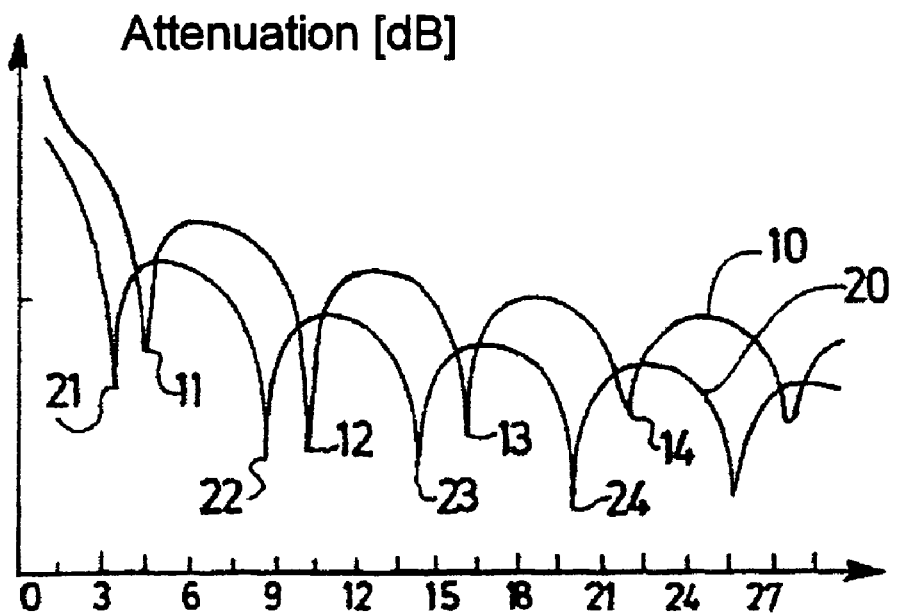
Figure 5:
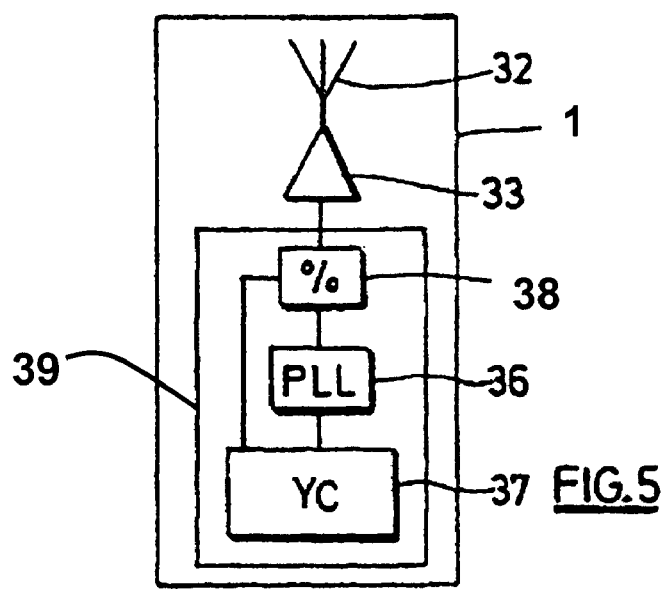
Figure 3:
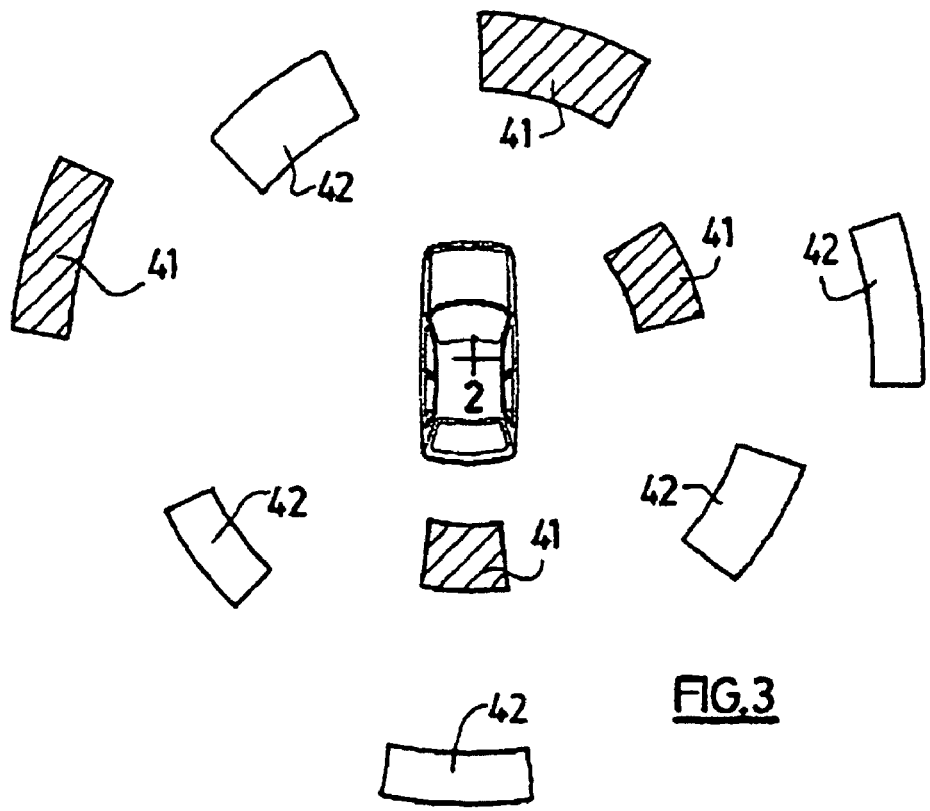
Figure 4:
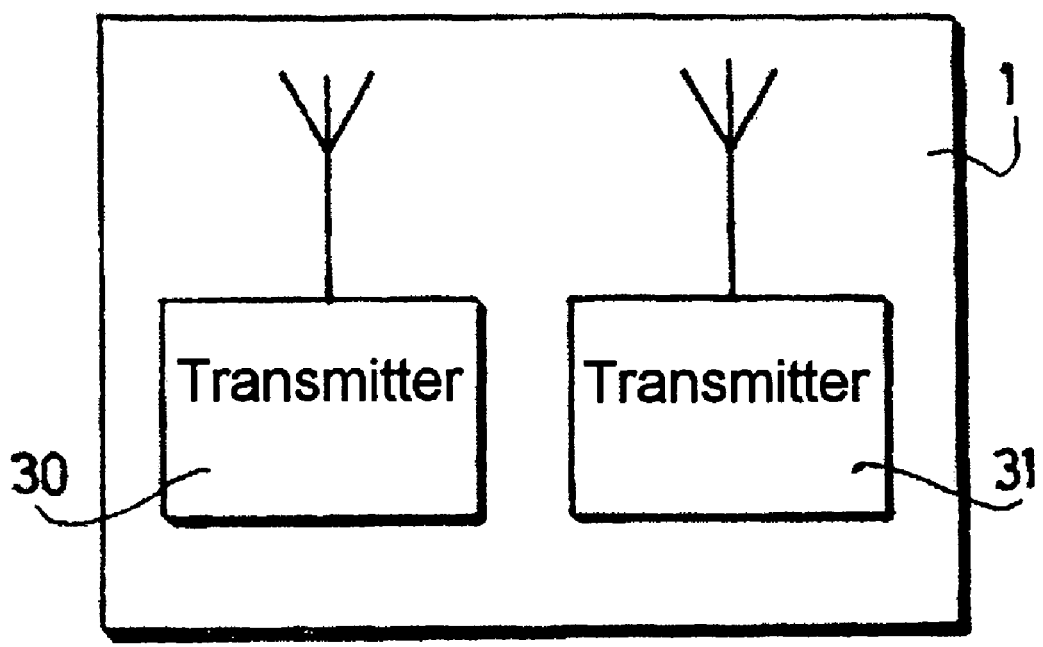

The invention will be better understood in the course of the detailed explanatory description which follows with reference to the figures in which:

FIG. 1 already described in the preamble represents a simplified diagram of the operation of an identification device known in the art, FIG. 2 represents for two different frequencies of the carrier a chart of the attenuation of the waves received by the receiver as a function of the distance between the transmitter and the receiver, FIG. 3 represents a diagram of "shadow zones" around a vehicle as a function of the wavelength of the carrier signal for two different frequencies of the carrier, FIG. 4 represents a first embodiment of a transmitter according to the invention, FIG. 5 represents a second embodiment of a transmitter according to the invention.

As explained in the introduction, the Applicant has noticed that there exist zones for which the amplitude of the total wave received by the receiver is greatly attenuated [lacuna] the "shadow zones". Represented in FIG. 2 is a chart of the attenuation of the waves received by the receiver 2 as a function of the distance between the transmitter 1 and the receiver 2. To illustrate the invention better, the curves 10 and 20 represented in this chart are theoretical curves which consider only the superposition of a direct incident wave 40 and of a wave that has been reflected 51 by the ground 2A (see FIG. 1). In reality, the receiver 2 receives a superposed multitude of waves reflected by various obstacles such as the person who is carrying the receiver, the bodywork of the vehicle, the walls of a building situated nearby, etc. However, the waves reflected by such obstacles have a weaker influence and are therefore neglected in what follows.

The curve 10 represents the attenuation received by the receiver when the wave transmitted has a given frequency (v1).

In this figure it may be seen that there exist distances for which the attenuation of the wave is greater. For example, the curve 10 of the attenuation of the wave which has a frequency (v1) exhibits minima 11, 12, 13 at distances of around 4.5, 10.5 and 16 meters. A receiver 2 having for example a sensitivity of −62 decibel milliwatts (dBm) cannot detect the sending of an identification signal when the user is 9.5 meters or 16 meters away, that is to say at a distance corresponding to the minimum 11 or 12. The identification device will therefore exhibit shadow zones of nonrecognition of the user for these distances.

The curve 20 of FIG. 2 also represents the attenuation of a wave transmitted at a frequency (v2) different from the first frequency (v1). In the present example, this is twice the frequency (v1). It may be noted that the attenuation curve 20 exhibits minima 21, 22, 23 at distances of 3.5, 8.5 and 14 meters and the Applicant has found that the distances for which the wave attenuation phenomenon is observed are different according to the frequency used. The position of the shadow zones of nonrecognition of a user is therefore dependent on the frequency used.

This is why the Applicant has had the idea of creating an identification device that comprises a second transmitter that transmits an identification signal on a carrier of a second frequency (v2) different from the first frequency in such a way that this second signal can serve as identifying signal in the zones of nonrecognition of the first signal.

Thus, to overcome the shadow zones for a given frequency, the Applicant has had the idea of transmitting the identification signal at two different carrier frequencies. The shadow zones being linked to the frequency, they therefore appear at different places, doing so as a function of the frequency considered. Under these conditions, if for a given frequency a shadow zone appears at a certain distance from the vehicle, the other frequency is preferably chosen in such a way as to exhibit a field maximum at this same distance. The radio range around the vehicle is not altered. As far as the user is concerned, everything occurs as if there were no shadow zones.

Advantageously the first frequency (v1) is substantially equal to 400 MHz.

Advantageously also the second frequency is equal to 800 MHz.

Preferably, the second frequency (v2) is equal to a harmonic of the first frequency (v1) and in particular an even harmonic.

FIG. 3 diagrammatically shows the shadow zones around the vehicle. The hatched zones 41 represent the shadow zones of nonrecognition of the signal sent at the frequency (v1). The surrounded zones 42 represent the shadow zones of nonrecognition of the signal sent at the frequency (v2). The geographical position of these waves is dependent on the frequency used. When the first frequency (v1) is different from the frequency (v2), these zones do not overlap. By virtue of the present invention, even if the user is in one of these zones, the receiver recognizes at least one of the two identification signals transmitted. Thus, the identification device according to the present invention is more reliable.

According to a first embodiment represented in FIG. 4, the identification device comprises two independent transmitters 30, 31 cooperating with associated receivers arranged in the vehicle. The first transmitter 30 and its associated receiver operate at the frequency (v1). The second transmitter 31 and its associated receiver operate at the frequency of (v2).

Advantageously, these transmitters 30, 31 may transmit an identification signal one after the other offset or simultaneously. It is also possible to provide for the second signal to be sent only if the user presses the control button of the transmitter a second time.

According to a second embodiment represented in FIG. 5, the first and the second transmitter 30, 31 are formed by a single transmission unit comprising means for toggling from the first to the second frequency and vice versa.

FIG. 5 represents an exemplary embodiment of a transmitter 1 according to the second embodiment. This transmitter consists of a synthesizer 39 linked to an amplifier 33 and an antenna 32. The synthesizer comprises a phase locked loop 36 (PLL) linked to a frequency divider 38. The phase locked loop as well as the frequency divider are both controlled by a microcontroller 37. The use of a synthesizer makes it possible to toggle relatively quickly from a first frequency (v1) to a second frequency (v2).

Of course, the identification device according to the present invention can also be used in so-called "hands free" devices without operating a remote control box.

The invention claimed is:

1. An identification device for controlling locking and unlocking of at least one openable panel of a vehicle and authorizing a starting of a vehicle, comprising:
    at least one signal transmitter for sending a first user identification signal on a first given carrier frequency to a receiver and at least one second user identification signal on a second carrier frequency different from the first carrier frequency,
    wherein the at least one second signal is able to serve as an identifying signal in shadow zones of the first signal, and
    wherein the second frequency is a harmonic of the first frequency.

2. The identification device according to claim 1, wherein the first and the at least one second signals are transmitted simultaneously.

3. The identification device according to claim 1, wherein the at least one second signal is transmitted at a time offset from the first signal.

4. The identification device according to claim 1, wherein the signal transmitter comprises a single transmission unit having a means for toggling between the first and the second carrier frequency.

5. The identification device according to claim 4, wherein the means for toggling comprises a synthesizer.

6. The identification device according to claim 5, wherein the synthesizer comprises a frequency divider controlled by a microcontroller and a phase locked loop.

7. The identification device according to claim 1, wherein the first frequency is substantially equal to 400 Megahertz.

\* \* \* \* \*